(12) United States Patent
Burazin et al.

(10) Patent No.: US 10,280,563 B2
(45) Date of Patent: May 7, 2019

(54) THREE-DIMENSIONAL PAPERMAKING BELT

(71) Applicant: Kimberly-Clark Worldwide, Inc., Neenah, WI (US)

(72) Inventors: Mark Alan Burazin, Oshkosh, WI (US); Lynda Ellen Collins, Neenah, WI (US); Geoffrey Fenn Carlow, Neenah, WI (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 136 days.

(21) Appl. No.: 15/326,514

(22) PCT Filed: Nov. 17, 2015

(86) PCT No.: PCT/US2015/061035
§ 371 (c)(1),
(2) Date: Jan. 16, 2017

(87) PCT Pub. No.: WO2016/085704
PCT Pub. Date: Jun. 2, 2016

(65) Prior Publication Data
US 2018/0209096 A1    Jul. 26, 2018

Related U.S. Application Data

(60) Provisional application No. 62/084,260, filed on Nov. 25, 2014.

(51) Int. Cl.
*D21F 1/80* (2006.01)
*D21F 11/00* (2006.01)
*B65G 15/42* (2006.01)
*B65G 15/54* (2006.01)
*D21F 11/14* (2006.01)

(52) U.S. Cl.
CPC ............ *D21F 11/006* (2013.01); *B65G 15/42* (2013.01); *B65G 15/54* (2013.01); *D21F 11/14* (2013.01)

(58) Field of Classification Search
USPC ........................................................ 162/362
See application file for complete search history.

(56) References Cited

U.S. PATENT DOCUMENTS

| | | |
|---|---|---|
| 4,111,634 A | 9/1978 | Limbach et al. |
| 5,204,055 A | 4/1993 | Sachs et al. |
| 5,672,248 A | 9/1997 | Wendt et al. |
| 7,914,649 B2 | 3/2011 | Ostendorf et al. |
| 2004/0126570 A1 | 7/2004 | Kramer et al. |
| 2004/0126601 A1 | 7/2004 | Kramer |

(Continued)

FOREIGN PATENT DOCUMENTS

| | | |
|---|---|---|
| DE | 10 2013 202 358 A1 | 8/2014 |
| EP | 1690982 A1 | 8/2006 |

(Continued)

*Primary Examiner* — Mark Halpern
(74) *Attorney, Agent, or Firm* — Kimberly-Clark Worldwide, Inc.

(57) ABSTRACT

The present invention relates to belts useful in the manufacture of paper products, such as tissue paper. Particularly this invention relates to a belt used in a through-air drying process for making tissue products, and more particularly to an additively manufactured belt having a particular pattern thereon which imparts properties to tissue products manufactured therewith.

8 Claims, 5 Drawing Sheets

(56) References Cited

U.S. PATENT DOCUMENTS

| | | |
|---|---|---|
| 2005/0280184 A1 | 12/2005 | Sayers et al. |
| 2006/0102302 A1 | 5/2006 | Bakken et al. |
| 2008/0073048 A1 | 3/2008 | Burazin et al. |
| 2015/0102526 A1 | 4/2015 | Ward et al. |
| 2016/0159007 A1 | 6/2016 | Miller et al. |
| 2016/0354979 A1 | 12/2016 | Manifold et al. |

FOREIGN PATENT DOCUMENTS

| | | |
|---|---|---|
| WO | 9300475 A1 | 1/1993 |
| WO | WO 1994/002905 A1 | 2/1994 |
| WO | 9853138 A1 | 11/1998 |
| WO | 9859110 A1 | 12/1998 |
| WO | 9910597 A1 | 3/1999 |
| WO | 0039393 A1 | 7/2000 |
| WO | 04061219 A1 | 7/2004 |
| WO | WO 2006/110031 A1 | 10/2006 |
| WO | WO 2014/085589 A1 | 6/2014 |

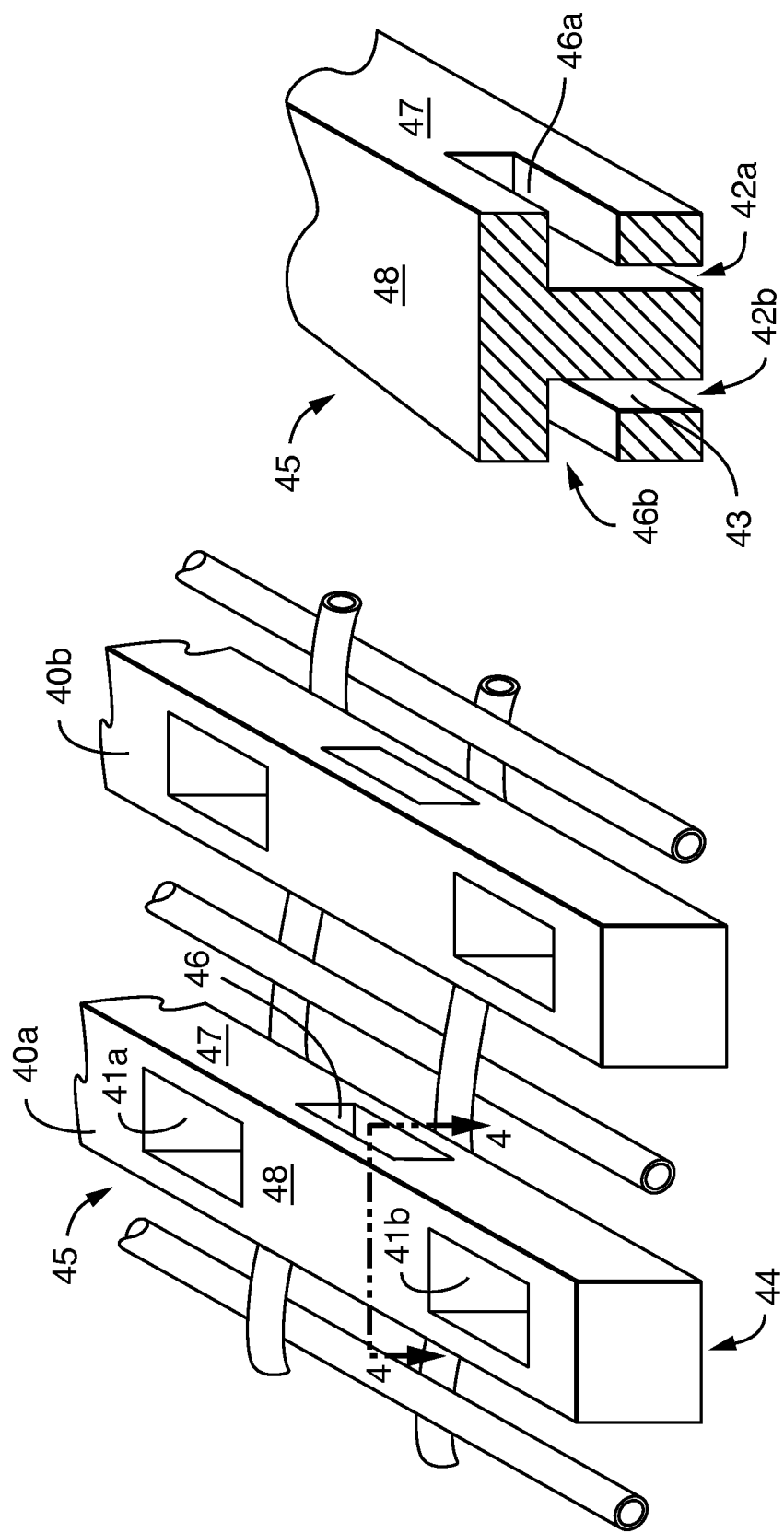

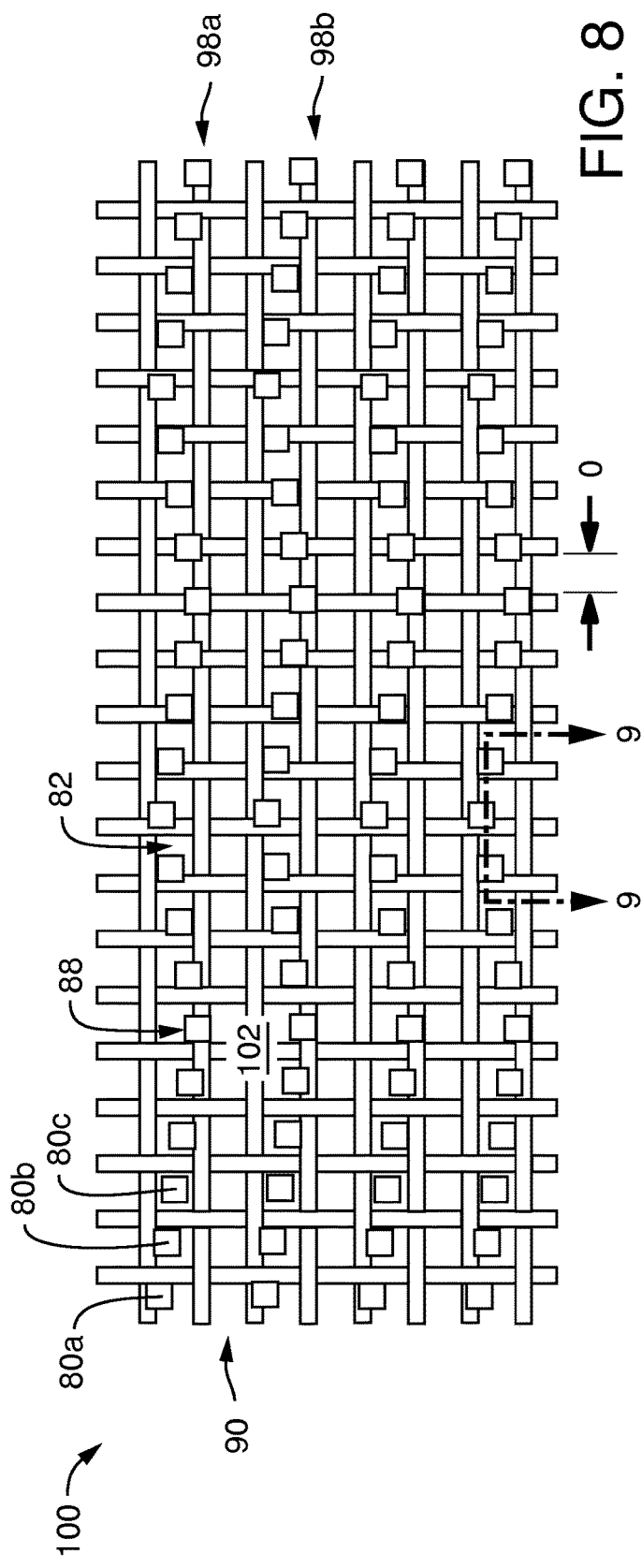
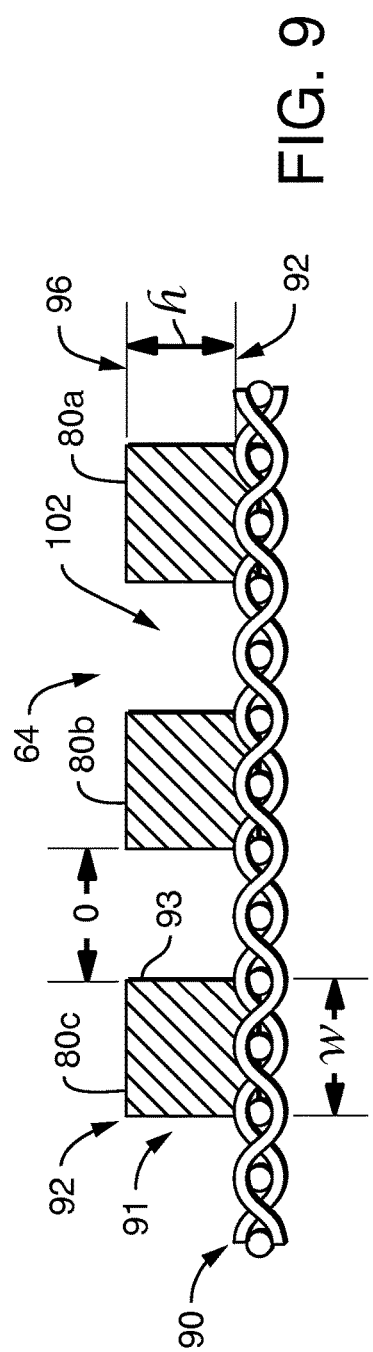
FIG. 8
FIG. 9

THREE-DIMENSIONAL PAPERMAKING BELT

This application is a 371 of PCT/US2015/061035 filed 17 Nov. 2015.

BACKGROUND

The present invention relates to the field of paper manufacturing. More particularly, the present invention relates to the manufacture of absorbent tissue products such as bath tissue, facial tissue, napkins, towels, wipers, and the like. Specifically, the present invention relates to improved fabrics used to manufacture absorbent tissue products having background regions optionally bordered by decorative elements, methods of tissue manufacture, methods of fabric manufacture, and the actual tissue products produced thereby.

In the manufacture of tissue products, particularly absorbent tissue products, there is a continuing need to improve the physical properties and final product appearance. It is generally known in the manufacture of tissue products that there is an opportunity to mold a partially dewatered cellulosic web on a papermaking fabric specifically designed to enhance the finished paper product's physical properties. Such molding can be applied by fabrics in an uncreped through-air dried process as disclosed in U.S. Pat. No. 5,672,248 or in a wet pressed tissue manufacturing process as disclosed U.S. Pat. No. 4,637,859. Wet molding typically imparts desirable physical properties independent of whether the tissue web is subsequently creped, or an uncreped tissue product is produced.

However, absorbent tissue products are frequently embossed in a subsequent operation after their manufacture on the paper machine, while the dried tissue web has a low moisture content, to impart consumer preferred visually appealing textures or decorative lines. Thus, absorbent tissue products having both desirable physical properties and pleasing visual appearances often require two manufacturing steps on two separate machines. Hence, there is a need for a single step paper manufacturing process that can provide the desired visual appearance and product properties. There is also a need to develop a paper manufacturing process that not only imparts visually discernable pattern and product properties, but which does not affect machine efficiency and productivity.

Previous attempts to combine the above needs, such as those disclosed in International Application Nos. PCT/US13/72220, PCT/US13/72231 and PCT/US13/72238 have utilized through-air drying fabrics having a pattern extruded as a line element onto the fabric. The extruded line element may form either discrete or continuous patterns. While such a method can produce textures, extrusion techniques are limited in the types of lines that may be formed resulting in reduced permeability of the through-air drying fabric. The reduced permeability in-turn decreases drying efficiency and negatively affects tissue machine efficiency and productivity.

As such, there remains a need for articles of manufacture and methods of producing tissue products having visually discernable patterns with improved physical properties without losses to tissue machine efficiency and productivity.

SUMMARY

The present invention provides a papermaking belt having a three dimensional design element formed by apertured elements or a plurality of spaced apart protuberances that may satisfy one or more of the foregoing needs. For example, a papermaking belt of the present invention, when used as a through-air drying fabric in a tissue making process, produces a tissue product having a substantially uniform density as well as optionally possessing visually discernible decorative elements. Therefore, in certain aspects the present invention provides a papermaking belt manufactured in-part using solid freeform fabrication (SFF) or layer manufacturing (LM) techniques, such as 3-D printing techniques. The resulting papermaking belt comprises a support structure, such as a continuous woven papermaking fabric, having an apertured three dimensional element disposed on the paper contacting surface thereof.

In other aspects the present invention provides a method of manufacturing a papermaking fabric by SFF. Solid freeform fabrication may be used to form a fabric having a three-dimensional element disposed on the sheet contact surface of a supporting structure wherein the element is formed layer by layer, in a stepwise fashion, out of a flowable material that is subsequently solidified so as to withstand the rigors of the papermaking process, such as high temperatures and humidity. Thus, in one aspect layers of flowable material are laid down, stepwise, in droplet form from an inkjet printing head onto a support structure, such as a woven papermaking fabric, in the desired locations and are each solidified as they are laid down.

In another aspect the present invention provides a method of manufacturing a papermaking belt comprising the steps of feeding a material from at least one nozzle onto a support structure, such as a woven papermaking fabric having a paper contacting and machine contacting surface, wherein the nozzle is moveable along a translational axis with respect to the support structure and the spacing between the nozzle and the support structure is adjustable, and wherein flow through the nozzle and the translational movement of the nozzle is controlled such that the nozzle dispenses the material in a controlled manner to form a plurality of discrete elements on the paper contacting surface of the support structure.

In yet other aspects the present invention provides an additive process for building a three-dimensional element on a support structure comprising the steps of providing a support structure; providing an extrusion head coupled to a z gantry for dispensing a flowable material selected from the group consisting of PET (polyester), PPS (polyphenylene sulphide), PCTA (poly 1,4 cyclohexane dimethylene terephthalate), PEN (polyethylene naphthalate), PVDF (polyvinylidene fluoride) and PEEK (polyetheretherketone), either alone or in combination onto the belt; transporting extrusion head or the continuous belt in the x and y directions while discharging the flowable material from the extrusion head onto the belt to form the cross-sectional shape of an element; and transporting the housing and head member in the z-direction simultaneously to form the element in elevation.

In other aspects the present invention provides a three-dimensional papermaking fabric comprising a support structure and a plurality of 3-D printed elements disposed thereon, the elements having a paper contacting surface lying in a first plane, a support structure contacting surface lying in a second plane, a first aperture lying in the first plane, a second aperture lying in the second plane and a continuous channel joining the first and second apertures.

In still other aspects the present invention provides a three-dimensional papermaking fabric comprising a continuous papermaking belt and a plurality of 3-D printed elements disposed thereon, the elements having a machine contacting surface and an opposed paper contacting surface and a pair of opposed sidewalls, the machine contacting and paper contacting surfaces each having an aperture joined by a continuous channel and at least one sidewall having an aperture connected to an aperture on the machine contacting surface by a continuous channel.

These and other aspects of the invention will now be more fully described with reference to the drawings.

DESCRIPTION OF THE DRAWINGS

FIG. 3 illustrates a perspective view of a papermaking fabric according to another embodiment of the present invention;

FIG. 4 illustrates a cross-sectional view of an element of FIG. 3 through the line 4-4;

FIG. 8 illustrates a belt comprising a plurality of discrete elements according to one embodiment of the present invention; and FIG. 9 illustrates a cross-sectional view of a belt taken through line 9-9 of FIG. 8.

DEFINITIONS

Figure 2:
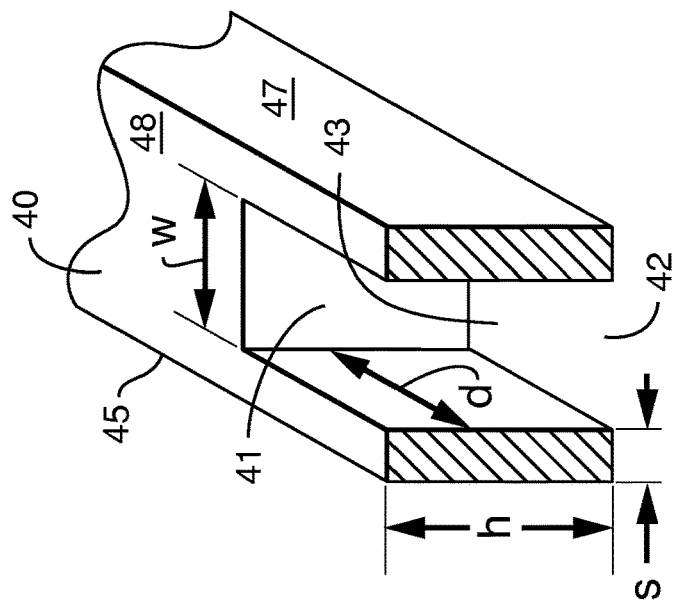
FIG. 2 illustrates a cross-sectional view of an element of FIG. 1 through the line 2-2.

As used herein, the term "tissue product" refers to products made from tissue webs and includes, bath tissues, facial tissues, paper towels, industrial wipers, foodservice wipers, napkins, medical pads, and other similar products. Tissue products may comprise one, two, three or more plies.

As used herein, the terms "tissue web" and "tissue sheet" refer to a fibrous sheet material suitable for forming a tissue product.

As used herein the term "element" refers to a material extending in the z-direction from the plane of a support structure.

As used herein the term "line element" refers to an element in the shape of a line, which may be a continuous, discrete, interrupted, and/or partial line with respect to a support structure on which it is present. The line element may be of any suitable shape such as straight, bent, kinked, curled, curvilinear, serpentine, sinusoidal and mixtures thereof.

As used herein the term "continuous line element" refers to a line element disposed on a support structure that extends without interruption throughout one dimension of the support structure.

As used herein the terms "discrete element" and "protuberance" refer to separate, unconnected elements disposed on a support structure. In one example, a plurality of discrete elements, such as dots and/or dashes for example, may be arranged so as to form a decorative pattern.

As used herein the term "curvilinear decorative element" refers to any line or visible pattern that contains either straight sections, curved sections, or both that are substantially connected visually. Curvilinear decorative elements may appear as undulating lines, substantially connected visually, forming signatures or patterns.

As used herein "decorative pattern" refers to any non-random repeating design, figure, or motif. It is not necessary that the curvilinear decorative elements form recognizable shapes, and a repeating design of the curvilinear decorative elements is considered to constitute a decorative pattern.

As used herein the term "aperture" refers to an opening disposed on one surface of a three-dimensional element or protuberance as disclosed herein.

As used herein, the term "solid free form fabrication" (SFF) generally refers to the three-dimensional printing of material using any one of the well-known layer manufacturing processes, such as stereo lithography, selective laser sintering, inkjet printing, laminated object manufacturing, fused deposition modeling, laser-assisted welding or cladding, and shape deposition modeling. SFF typically involves representing a 3-D object with a computer-aided design (CAD) geometry file, converting the design file into a machine control command and using the command to drive and control a part-building tool for building parts essentially point-by-point or layer-by-layer.

As used herein, the term "3-D printed" generally refers to a fused deposition modeling process (hereinafter abbreviated to FDM) as described in U.S. Pat. No. 5,121,329, the contents of which are hereby incorporated by reference in a manner consistent with the present disclosure, and generally employs a heated nozzle to melt and extrude out a material such as nylon, ABS plastic (acrylonitrile-butadiene-styrene) and wax. The build material is supplied into the nozzle in the form of a rod or filament.

As used herein, the term "printing head" means the entire device for the conveying, melting and application of a filament in an extrusion-based 3-D printing process.

DETAILED DESCRIPTION

The present inventors have now surprisingly discovered that solid free form fabrication may be used to produce novel paper machine clothing useful in the manufacture of paper webs and more particularly tissue webs. In particular the present inventors have discovered that solid free form fabrication may be used to fabricate three-dimensional elements on a support structure, such as a continuous woven papermaking belt, that may in turn be used to produce a tissue product having a substantially uniform density as well as visually discernible decorative elements. Producing the three-dimensional elements by solid free form fabrication provides the benefit of being able to form apertures on both the support structure and paper contacting surfaces of the elements and connecting the apertures with continuous channels. These continuous channels, which join the two surfaces of the elements facilitate removal of water from the wet paper web during production. Further, the elements themselves may impart the web with a three-dimensional pattern that is visually distinctive.

Figure 1:
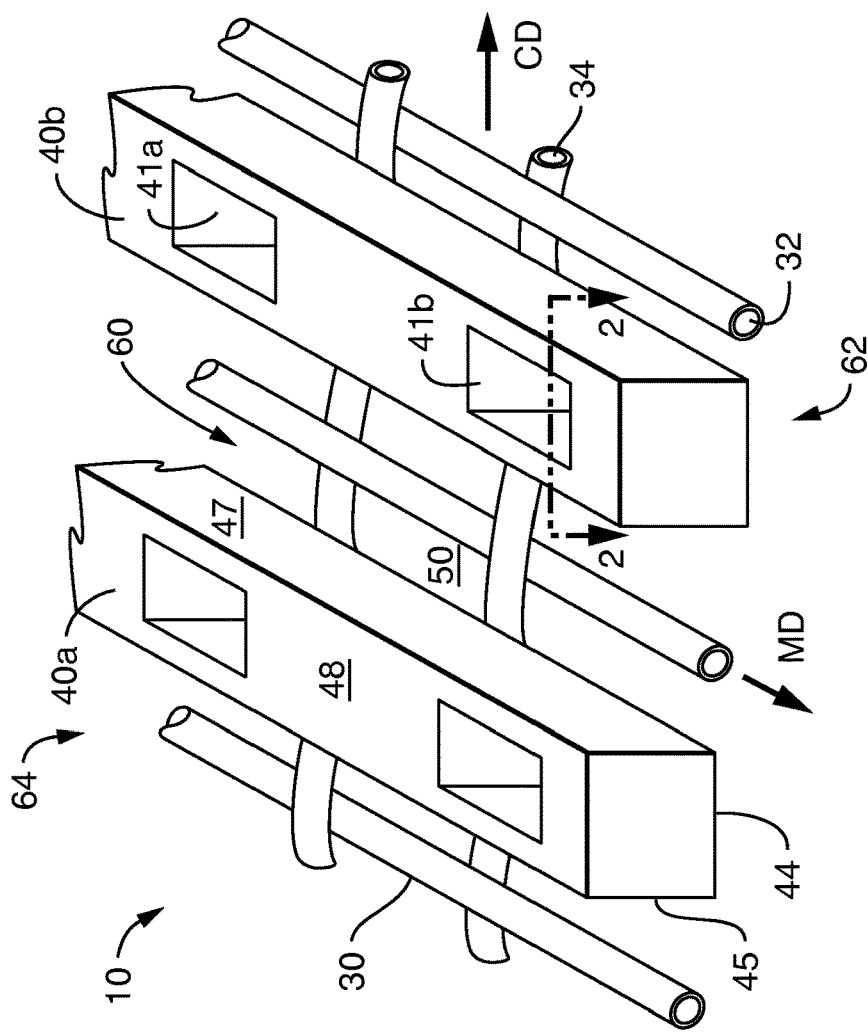
FIG. 1 illustrates a perspective view of a papermaking fabric according to one embodiment of the present invention.

With reference now to FIG. 1 an endless belt 10 comprising a pair of elements 40a, 40b and a support structure 30 (also referred to herein as a fabric) is illustrated. The support structure 30 has two principle dimensions—a machine direction ("MD"), which is the direction within the plane of the belt 10 parallel to the principal direction of travel of the tissue web during manufacture and a cross-machine direction ("CD"), which is generally orthogonal to the machine direction. The support structure 30 is generally permeable to liquids and air. In one particularly preferred embodiment the support structure is a woven fabric. The support structure may be substantially planar or may have a three-dimensional surface defined by ridges. In one embodiment the support structure is a substantially planar woven fabric such as a multi-layered plain-woven fabric 30 having base warp yarns 32 interwoven with shute yarns 34 in a 1×1 plain weave pattern. One example of a suitable substantially planar woven fabric is disclosed in U.S. Pat. No. 8,141,595, the contents of which are incorporated herein in a manner consistent with the present disclosure. In a particularly preferred embodiment the support structure 30 comprises a substantially planar woven fabric wherein the plain-weave load-bearing layer is constructed so that the highest points of both the load-bearing shutes 34 and the load-bearing warps 32 are coplanar and coincident with the plane.

The support structure 30 comprises a pair of opposed major surfaces—a web contacting surface 64 and a machine contacting surface 62. Machinery employed in a typical papermaking operation is well known in the art and may include, for example, vacuum pickup shoes, rollers, and drying cylinders. In one embodiment the belt comprises a through-air drying fabric useful for transporting an embryonic tissue web across drying cylinders during the tissue manufacturing process. In such embodiments the web contacting surface 64 supports the embryonic tissue web, while the opposite surface, the machine contacting surface 62, contacts the through-air dryer.

With further reference to FIG. 1 the elements 40a, 40b are generally affixed to the support structure and extend in the z-direction away from the plane 50 of the support structure 30 to form part of the web contacting surface 64. Generally the elements 40a, 40b are disposed on the support structure 30 using solid free form fabrication, which will be discussed in more detail below, and comprise a plurality of apertures 41a, 41b disposed along their upper surface 48 which generally lies above the plane 50 of the support structure 30 and forms part of the web contacting surface 64.

In addition to elements 40a, 40b, the web-contacting surface 64 preferably comprises a plurality of landing areas 60. The landing areas 60 are generally bounded by the elements 40a, 40b and coextensive with the top surface plane 50 of the belt 10. Landing areas 60 are generally permeable to liquids and allow water to be removed from the cellulosic fibrous structure by the application of differential fluid pressure, by evaporative mechanisms, or both when drying air passes through the embryonic tissue web while on the papermaking belt 10 or a vacuum is applied through the belt 10. Without being bound by any particularly theory, it is believed that the arrangement of elements and landing areas allow the molding of the embryonic web causing fibers to deflect in the z-direction and generate the caliper of, and aesthetic patterns on, the resulting tissue web.

Turning now to FIG. 2 an element 40 generally has a bottom surface 44 lying in a first plane. The bottom surface generally forms the contact between the support structure and the element. Opposed to the bottom surface 44 is a top surface 48 lying in a second plane above the first plane. The bottom 44 and top 48 surfaces are joined by a pair of opposed sidewalls 45, 47 resulting in the illustrated element 40 having a height (h) and a width (w). Accordingly, in the illustrated embodiment, the element 40 has generally planar sidewalls 45, 47 and a square cross-section where the width (w) and height (h) are equal. In such embodiments w and h may vary from about 0.6 to about 3.0 mm, in a particularly preferred embodiment w and h may vary from about 0.7 to about 1.4 mm and still more preferably from about 0.8 to about 1.0 mm. While the illustrated element has a square cross-section, the invention is not so limited, as will be discussed in more detail below.

In addition to having square cross-sections, such as illustrated in FIG. 2, the element cross-section may be rectangular, trapezoidal, triangular, convex or concave. For example, the elements may comprise generally planar bottom and top surfaces joined by sidewalls that converge towards one another as they extend from the bottom to the top surface, resulting in an element having a trapezoidal cross-section. Further, the elements 40 may have a width (w) greater than about 0.5 mm, such as from about 0.5 to about 3.5 mm, more preferably from about 0.7 to about 1.4 mm, and in a particularly preferred embodiment between from about 0.8 to about 1.0 mm. The width is generally measured normal to the principal dimension of the elevation within the plane of the belt at a given location. Where the element 40 has a generally square or rectangular cross-section, the width (w) is generally measured as the distance between the two planar sidewalls 45, 47 that form the element 40. In those cases where the element does not have planar sidewalls, the width is measured along the base of the element at the point where the element contacts the carrier.

As illustrated in FIG. 2 the elements 40 may comprise a pair of opposed apertures 41, 42 joined by a continuous channel 43. The first aperture 41 is disposed on the top surface 48 of the element 40 and a second aperture 42 is disposed on the bottom surface 44. The apertures 41, 42 are joined by a continuous channel 43 that generally extends through the element 40 creating a continuous passageway between the bottom 44 and top surface 48. Preferably the continuous channel 43 is shaped so as to permit the passage of air and/or water through the element. In certain embodiments the channel 43 may have a horizontal cross-section that is essentially circular, oval, triangular, square, rectangular, pentagonal, or hexagonal. The apertures may have similar or different horizontal cross-sections relative to one another and the channel that joins them. In the embodiment illustrated in FIG. 2 both the apertures 41, 42 and the channel 43 have a rectangular horizontal cross-section.

Just as the horizontal cross-sectional shape of the aperture may vary, the volume of the aperture may vary depending on desired permeability of the belt. For example, in certain embodiments the apertures may have a volume of about 20 percent or greater of the volume of the element, such as from about 20 to about 90 percent and more preferably from about 50 to about 90 percent. The length of the channel may vary as it may take variety of paths to connect a pair of opposed apertures, however in a preferred embodiment the channel is substantially linear and has a length that is essentially the same as the height of the element.

Where the apertures and channels are substantially similar in size and shape, such as having substantially rectangular horizontal cross-section, the width (w) may be about 0.1 mm or greater, such as from about 0.1 to about 3.0 mm and more preferably from about 0.1 to about 2.0 mm. The channel sidewalls, illustrated in FIG. 2 as s, are generally thick enough to resist deformation in use, such as greater than about 0.08 mm, such as from about 0.08 to about 0.5 mm and more preferably from about 0.10 to about 0.2 mm. The size of the apertures, as well as the channel connecting them, may be varied to achieve the desired web dewatering and drying properties as well as the aesthetics of the resulting web. For example, by suitable choice of aperture dimensions and shape, the degree of visibility of the aperture pattern in the resulting tissue may be made as faint or as distinct as desired.

With reference now to FIG. 3, in other embodiments, elements 40a, 40b may comprise one or more apertures 46 disposed along one or both of the element sidewalls 45, 47. Like the apertures 41a, 41b disposed along the top surface 48 of the element, and discussed above, the sidewall aperture 46 may have any number of different cross-section shapes, including a rectangular cross-section as illustrated in FIG. 3. The sidewall aperture 46 is generally connected to an aperture 42 disposed on the bottom surface 44 of the element 40. As best illustrated in FIG. 4, a continuous channel 43 joins the sidewall aperture 46a and the bottom surface aperture 42a creating a continuous passageway between the sidewall 47 and the bottom 44 of the element. In this manner, as the web is molded around the element during manufacture water may pass from the web in contact with the sidewall, through the element and exit the bottom. Without being bound by any particular theory it is believed that this additional passageway for water enhances drying and improves molding of the embryonic web.

In addition to taking any number of different cross-sectional shapes, the sidewall apertures may be spaced and arranged along the element sidewalls in a variety of patterns to improve drying efficiency and maximize molding of the web. For example, in one embodiment the sidewall aperture is orientated substantially in parallel to the plane of the web-contacting surface of the support structure. Further, the sidewall apertures may be located along any height of the element, however, in certain embodiments to improve the molding of the tissue web the apertures are disposed along the lower third of the element and more preferably adjacent to the point at which the element contacts the support structure.

Figure 5:
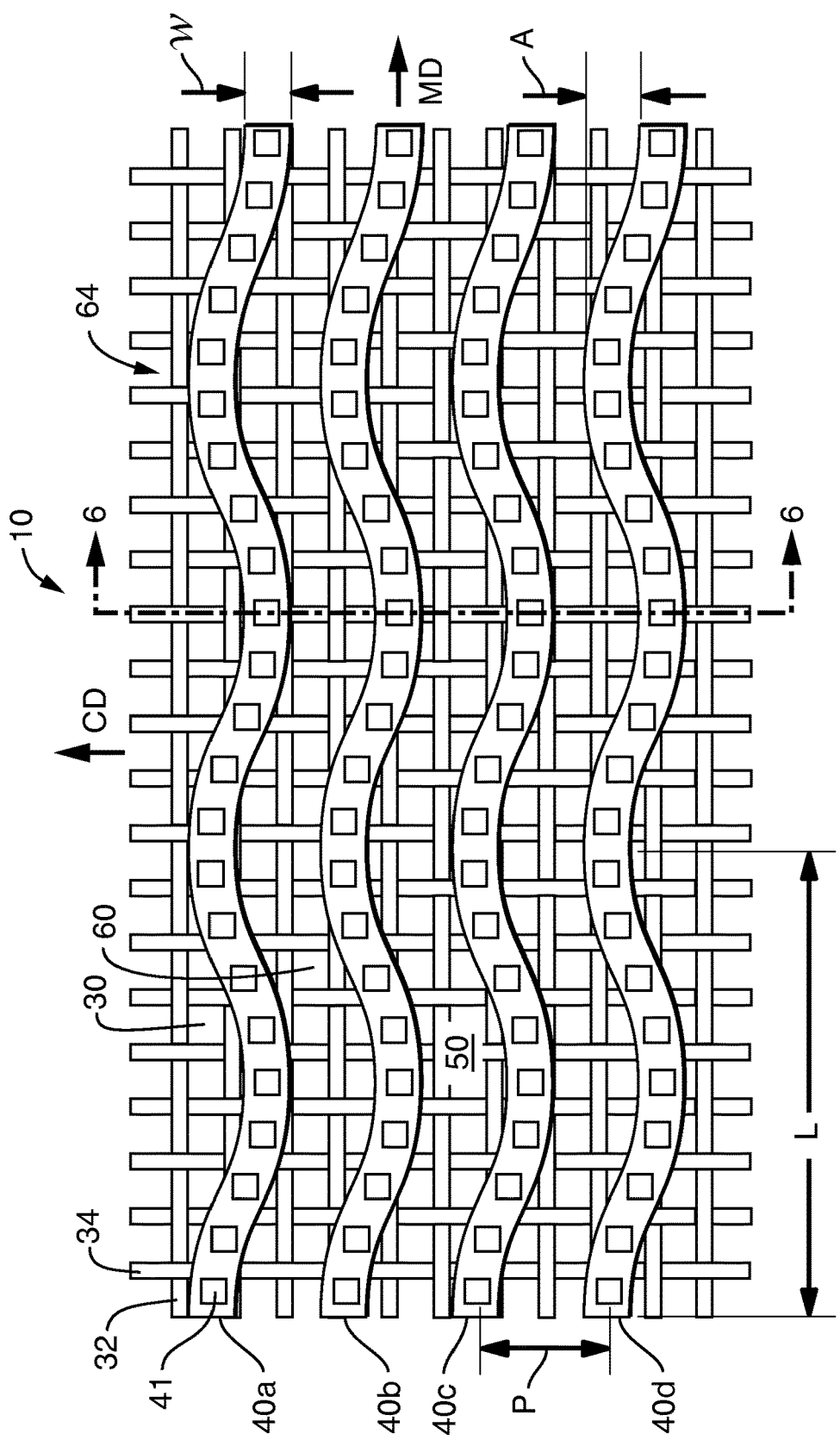
FIG. 5 illustrates a top view of a fabric useful in the manufacture of tissue webs according to one embodiment of the present disclosure.

Turning now to FIG. 5, the endless belt 10 may comprise a plurality of elements 40a-40d oriented substantially in the MD direction and spaced apart from one another across the CD direction of the support structure 30. The elements 40a-40d are illustrated as being continuous line elements and more specifically continuous line elements having a sinusoidal or wave-like shape, however, the invention is not so limited. The elements 40a-40d generally extend in the z-direction away from the plane 50 of the support structure 30 to form part of the web contacting surface 64. The elements 40a-40d comprise a plurality of apertures 41 along their top surface 48, which forms part of the web contacting surface 64. As discussed above, the aperture 41 is preferably in communication with an aperture on the bottom surface of the element via a continuous channel. In this manner when the belt 10 is supporting a web during manufacture the web is brought in contact with the top surface 48 and water may pass through the apertures 41 and be transported through the element to the bottom surface (not illustrated in FIG. 5) to facilitate dewatering of the web.

The spacing and arrangement of the elements may vary depending on the desired tissue product properties and appearance. In one embodiment, such as that illustrated in FIG. 5, a plurality of elements 40a-40d extend continuously throughout one dimension of the belt 10 and each element is spaced apart from adjacent element. Thus, the elements may be spaced apart across the entire cross-machine direction of the belt, may endlessly encircle the belt in the machine direction, or may run diagonally relative to the machine and cross-machine directions. Of course, the directions of the elements alignments (machine direction, cross-machine direction, or diagonal) discussed above refer to the principal alignment of the elements. Within each alignment, the elements may have segments aligned at other directions, but aggregate to yield the particular alignment of the entire elements.

The spaced apart elements 40a-40d form landing areas 60 there between, which together with the elements generally make up the web contacting surface 64 of the belt 10. In use, as the embryonic tissue web is formed fibers are deflected in the z-direction by the continuous elements, however, the spacing of elements is such that the web maintains a relatively uniform density. This arrangement provides the benefits of improved web extensibility, increased sheet bulk, better softness, and a more pleasing texture. These properties may be influenced varying the percentage elements constituting the web contacting surface. For example, in certain embodiments, the spacing and arrangement may be adjusted such that the elements constitute greater than about 15 percent of the web contacting surface, such as from about 15 to about 35 percent, more preferably from about 18 to about 30 percent, and still more preferably from about 20 to about 25 percent of the web-contacting surface.

An additional means of altering the physical properties of manufactured webs, such as caliper, density and cross-machine direction stretch and toughness, is to alter the shape of the element and particularly the shape of line elements, as well as the spacing and arrangement of line elements relative to one another. For example, the line element may have a wave-like pattern where the line elements are arranged in-phase with one another such that P (the distance between adjacent elements measured from the center of one element to the center of the adjacent element) is approximately constant. In other embodiments elements may form a wave pattern where adjacent elements are offset from one another. In still other embodiments the line elements may be linear. In other embodiments the elements may be linear and form a pattern having adjacent linear elements that alternate between a maximum spacing when the line elements diverge away from each other and minimum spacing when the line elements converge toward each other. In a particularly preferred embodiment, regardless of the particular element pattern, or whether adjacent patterns are in or out of phase with one another, the elements are separated from one another by some minimal distance.

In one preferred embodiment, such as that illustrated in FIG. 5, the elements 40a-40d are continuous line elements having a sinusoidal shape and are arranged substantially parallel to one another such that none of the elements intersect one-another. As such, in the illustrated embodiment, the adjacent sidewalls of individual elements are equally spaced apart from one another. In such embodiments, the center-to-center spacing of design elements (also referred to herein as pitch or simply as p) may be greater than about 1.0 mm, such as from about 1.0 to about 20 mm apart and more preferably from about 2.0 to about 10 mm apart. In one particularly preferred embodiment the continuous elements are spaced apart from one-another from about 3.8 to about 4.4 mm. Without being bound by any particular theory it is believed that this spacing and arrangement of sinusoidal elements results in improved caliper and cross-machine direction tensile properties, such as stretch. Further, this arrangement provides a tissue web having a three-dimensional surface topography, yet relatively uniform density.

Where the elements have a wave-like shape, such as those illustrated in FIG. 5, the elements 40a-40d have an amplitude (A) and a wavelength (L). The amplitude may range from about 2.0 to about 200 mm, in a particularly preferred embodiment from about 10 to about 40 mm and still more preferably from about 18 to about 22 mm. Similarly, the wavelength may range from about 20 to about 500 mm, in a particularly preferred embodiment from about 50 to about 200 mm and still more preferably from about 80 to about 120 mm.

Figure 6:
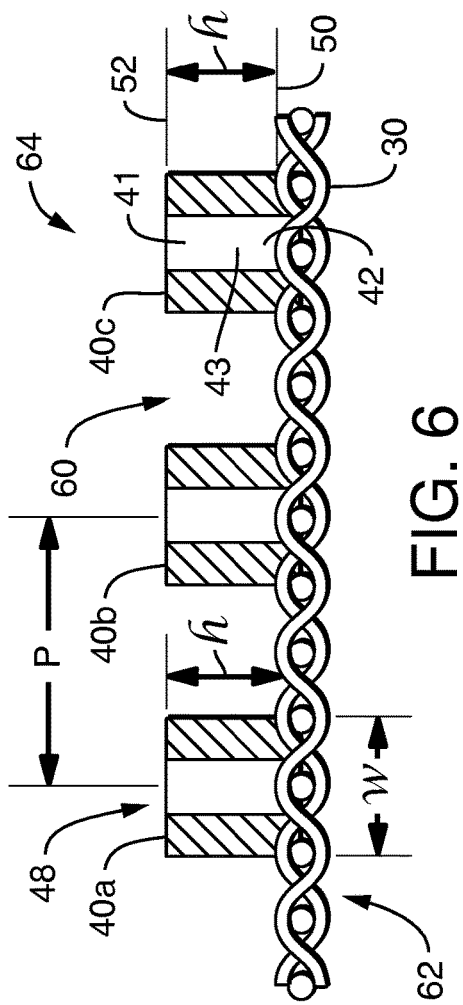
FIG. 6 illustrates a cross-sectional view of a fabric taken through line 6-6 of FIG. 5.

Turning to FIG. 6, which illustrates a cross-sectional view of a papermaking fabric according to one embodiment of the present invention. The fabric generally comprises a web contacting surface 64 and a machine contacting surface 62. The web contacting surface 64 comprises landing areas 60 generally bounded by elements 40a, 40b, 40c which extend in the z-direction from the the top surface plane 50 of the belt. The elements 40a, 40b, 40c comprise apertures 41 which have a continuous channel 43 that extends to the bottom surface aperture 42 creating a continuous passageway between the top and the bottom of the element. The elements 40 generally have a height (h), measured between the top plane 50 of the belt and the top plane 52 of the element, and a width (w), measured between the element sidewalls. Further, the elements are spaced apart from one another a distance (p), which is measured between the mid-points of adjacent elements.

Figure 7:
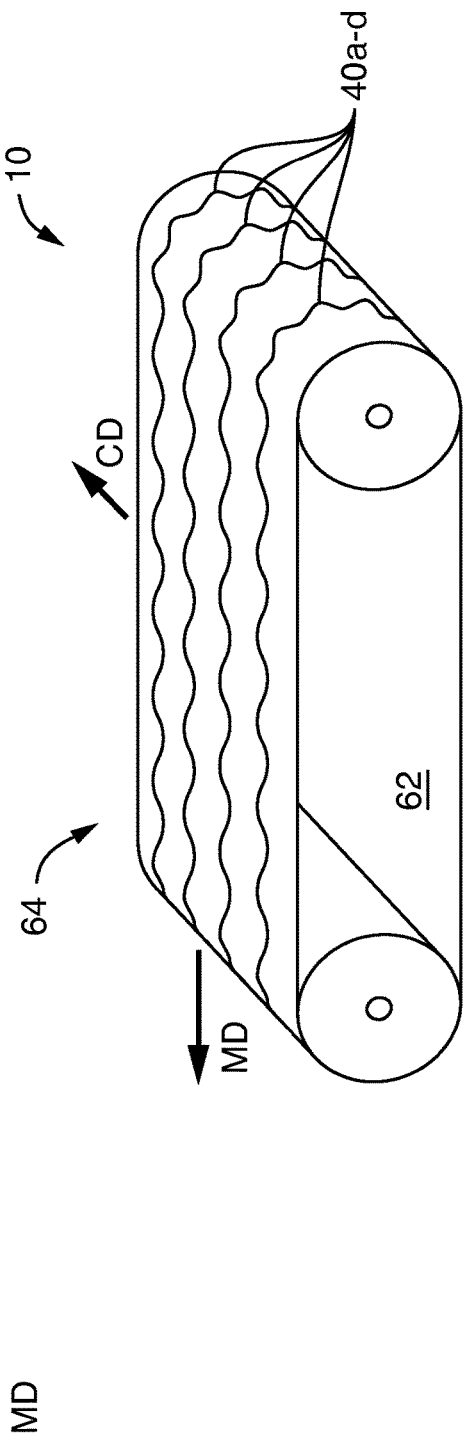
FIG. 7 illustrates a perspective view of a continuous fabric useful in the manufacture of tissue webs according to one embodiment of the present disclosure.

In a particularly preferred embodiment, such as that illustrated in FIG. 7, the elements 40a-40d are continuous line elements and extend substantially throughout one dimension of the belt 10, and each line element in the plurality is spaced apart from adjacent elements. In this manner the elements may span the entire cross-machine direction of the belt or may endlessly encircle the belt in the machine direction. As the continuous elements generally extend substantially throughout one dimension of the belt they are distinguishable from patterns formed from a plurality of discrete elements, which is another embodiment of the present invention and will be discussed in further detail below. Thus, in certain embodiments the landing areas provide a visually distinctive interruption to the first and second continuous line elements which extend substantially in the machine direction orientation.

Turning now to another embodiment of the present invention where the elements are discrete, rather than continuous as described above. For clarity, the discrete elements will be referred to herein as protuberances. Protuberances according to various embodiments of the present invention are illustrated in FIGS. 8 and 9. Generally the protuberances 80a-80c are discrete and spaced apart from one another. Each protuberance 80a-80c is joined to a support structure 90 and extends outwardly from the web contracting plane 92 thereof. The protuberances 80a-80c terminate in an upper surface 82 that lies in a second plane 96 above the plane 92 of the support structure 90. The difference between the two planes 92, 96 is generally representative of the height of the protuberance (h). In this manner the web contacting surface 98 comprises the web facing surface 91 and upper surface 82 of the protuberances 80a-80c and has two principle planes 92, 96 lying in two different elevations.

The protuberances 80a-80c illustrated in FIG. 9 generally have a square horizontal and lateral (relative to the plane 92 of the support structure 90) cross-sectional shape, however, the shape is not so limited. The protuberances 80a-80c may have any number of different horizontal and lateral cross-sectional shapes. For example, the horizontal cross-section may have a rectangular, circular, oval, polygonal or hexagonal shape. Further, a single belt may comprise protuberances having the same or different cross-sectional shapes. A particularly preferred protuberance is substantially square shaped having sidewalls that are generally perpendicular to the plane of the support structure. Alternatively, the protuberances may have a tapered lateral cross-section formed by sides that converge to yield a protuberance having a base that is wider than the distal end.

In certain embodiments the individual protuberances may be arranged to create a decorative pattern. In one particular embodiment, such as that illustrated in FIG. 8, protuberances 80a-80c are spaced and arranged in a non-random pattern so as to create a wave-like decorative pattern 98. The belt 100 comprises a plurality of decorative patterns 98a, 98b that are substantially orientated in the machine direction and spaced apart from one another. As a result of the spacing and arrangement of decorative patterns 98a, 98b, landing areas 102 are created between adjacent patterns 98a, 98b. The landing areas 102 provide a visually distinctive interruption to the decorative pattern 98 formed by the individual spaced apart protuberances 80a-80c. In this manner, despite being discrete elements, the protuberances 80a-80c may be spaced apart so as to form a visually distinctive curvilinear decorative pattern that extends substantially in the machine direction. Thus, in certain embodiments, taken as a whole the discrete elements form a wave-like decorative pattern. The wave-like decorative pattern may have dimensions similar to those described above for line elements forming wave-like patterns, such as an amplitude from about 10 to about 40 mm and a wavelength from about 50 to about 200 mm. Further the individual wave-like patterns may be spaced apart from one another from about 1.0 to about 20 mm apart and more preferably from about 2.0 to about 10 mm apart.

In other embodiments the protuberances may be spaced and arranged so as to form a decorative figure, icon or shape such as a flower, heart, puppy, logo, trademark, word(s) and the like. Generally the design elements are spaced about the support structure and can be equally spaced or may be varied such that the density and the spacing distance may be varied amongst the design elements. For example, the density of the design elements can be varied to provide a relatively large or relatively small number of design elements on the web. In a particularly preferred embodiment the design element density, measured as the percentage of background surface covered by a design element, is from about 10 to about 35 percent and more preferably from about 20 to about 30 percent. Similarly the spacing of the design elements can also be varied, for example, the design elements can be arranged in spaced apart rows. In addition, the distance between spaced apart rows and/or between the design elements within a single row can also be varied.

While the protuberances may be spaced and arranged so as to form a decorative pattern, adjacent protuberances are generally spaced apart from one another so as to create spaces there-between. Depending upon the arrangement and spacing of individual protuberances relative to one another the inter-protuberance spaces may or may not occur as voids that are permeable to air and liquid. In certain embodiments the space may be entirely devoid of yarns used to form the support structure, may be partially obscured by a yarn or may be entirely obscured by a yarn. Thus, the spaces may have varying degrees of air and liquid permeability. In certain embodiments where the belt is a through-air drying fabric used to support an embryonic tissue web during drying it may be desirable to provide a high percentage of spaces entirely or substantially devoid of yarns and protuberances so as to facilitate the passage of air through the fabric and subsequently the embryonic web. In such embodiments the presence of areas entirely devoid of protuberances and yarn may improve drying efficiency. As the spaces are defined by the space between adjacent protuberances they may generally vary in width from about 0.1 to about 1 mm, such as from about 0.2 to about 0.6 mm and more preferably from about the 0.25 to about 0.5 mm.

The size of the protuberances and the spacing between adjacent protuberances may be the same throughout a given design or an entire belt or it may be varied throughout a design or the entire belt. For example, a design may be formed by protuberances having two, three, four or five different sizes where the space between the protuberances varies depending on the relative size of the adjacent protuberances. Thus, in certain embodiments the ratio of the surface area of protuberances and the width of the spaces may range from about 5:1 to about 1:2, such as from about 4:1 to about 1:1.

With reference to FIG. 9, when protuberances 80a-80c are spaced apart from one another they define landing areas 102 there-between. The landing areas 102 are generally bounded by the protuberances 80a-80c and coextensive with the top surface plane 92 of the support structure 90. Landing areas 102 are generally permeable to liquids and allow water to be removed from the cellulosic fibrous structure by the application of differential fluid pressure, by evaporative mechanisms, or both when drying air passes through the embryonic tissue web while on the papermaking belt 100 or a vacuum is applied through the belt 100.

The elements of the present invention, including line elements and discrete protuberances, are generally formed by depositing a polymeric material on the support structure in any suitable manner. Thus in certain embodiments elements are formed by extruding, such as that disclosed in U.S. Pat. No. 5,939,008, the contents of which are incorporated herein by reference in a manner consistent with the present disclosure, or printing, such as that disclosed in U.S. Pat. No. 5,204,055, the contents of which are incorporated herein by reference in a manner consistent with the present disclosure, a polymeric material onto the support structure. In other embodiments the design element may be produced, at least in some regions, by extruding or printing two or more polymeric materials.

In one embodiment the elements are formed using SFF or layer manufacturing (LM) techniques, such as 3-D printing techniques described in U.S. Pat. No. 5,204,055. Generally, 3-D printing techniques may be employed to form an element from a series of layers of material with each layer printed and formed on top of the previous layer.

Three-dimensional printing of the elements generally begins with creating a computer model of the element in three dimensions using a suitable computer modeling program known in the art. The computer model of the element is completely sectioned into a series of horizontal digital slices to define a set of slice patterns for each layer.

In one embodiment the elements may be formed using one or more printheads that span at least a portion of the width of the belt. The printheads may be moveable so as to print materials onto a static belt, or the belt may be moved and the printheads may be fixed. Regardless, it is generally preferred that the moving object be moved at a substantially constant speed in a flat plane. In one particularly preferred embodiment a plurality of printheads extend across the width of the belt, which is moved in a flat plane during printing, perpendicular to the direction of travel of the belt and are, preferably, spaced along the belt with substantially constant separations. However, constant separation of the printheads is not critical.

The printheads print one layer of an object onto the previously printed layer. Thus the first printhead prints the first layer, the second printhead prints a second layer onto the first layer and the Nth printhead prints an Nth layer onto the (n−1)th layer.

The layers are of a constant thickness and the printheads are controlled so that, in plane view, layers are printed on top of each other. The distance from each of the printheads to the surface upon which they print is also preferably the same for all printheads. Thus the distance from the first printhead to the substrate is preferably the same as the distance from the seventh printhead to the sixth layer. This may be achieved by sequentially raising the printhead(s) for each layer by the voxel height. In this situation, droplets ejected by printheads for different layers at exactly the same time will arrive at their destinations at the same time.

In certain embodiments the elements may be formed with an aperture. The apertures generally function as fluid passageways or for other purposes and remain 'empty' of printed or inserted materials in the finished product. It will be appreciated that the aperture may vary in shape and may include squares, rectangles, ovals and circles, and polygons having an odd number of sides. The apertures may be the same or different shapes and may be the same or different size. In particularly preferred embodiments an aperture is disposed on at least two different surfaces of an element and the apertures are connected to one another by a continuous channel. The continuous channel places the pair of apertures in communication with one another and creates a passageway through the element.

The printing system may comprise a means for moving the belt as it is printed. Preferably the belt is moved at a substantially constant velocity in a flat plane. The belt may be directly driven or may be located on a conveyor system.

The materials printed by the printheads may include photo-curable and self-curing resins. Photocurable resins may include resins curable by UV curing, visible light curing, electron beam curing, gamma radiation curing, radiofrequency curing, microwave curing, infrared curing, or other known curing methods involving application of radiation to cure a resin. Suitable resins may also include those that may be cured via chemical reaction without the need for added radiation as in the curing of an epoxy resin, extrusion of an autocuring polymer such as polyurethane mixture, thermal curing, solidifying of an applied hotmelt or molten thermoplastic.

In certain embodiments the polymeric material may comprise PET (polyester), PPS (polyphenylene sulphide), PCTA (poly 1,4 cyclohexane dimethylene terephthalate), PEN (polyethylene naphthalate), PVDF (polyvinylidene fluoride) or PEEK (polyetheretherketone), either alone or in combination. Generally, such materials are capable of withstanding continuous service up to 500° F. in the presence of air and water vapor.

In other embodiments the polymeric material comprises a thermoplastics such as, for example, a thermoplastic comprising from about 0.5 and 10 weight percent silicone and a base polymer selected from the group consisting of polyethersulfones, polyetherimides, polyphenylsulfones, polyphenylenes, polycarbonates, high-impact polystyrenes, polysulfones, polystyrenes, acrylics, amorphous polyamides, polyesters, nylons, PEEK, PEAK and ABS.

In still other embodiments the materials may comprise a polymeric material having a viscosity greater than 70,000 Centipoise (cP) and preferably in a range from about 100,000 to about 150,000 cP, measured according to ASTM D790-10 at 120° C. In certain preferred embodiments the polymer material comprises at least one of a polyurethane, a silicone, or a polyureas and has a viscosity from about 120,000 to about 140,000 cP.

In one preferred embodiment the belt of the present invention is prepared by an LM method comprising an extrusion head that extrudes heated, flowable modeling material from a nozzle onto a support structure. The extruded material is deposited layer-by-layer in areas defined from a CAD model, as the extrusion head and the support structure are moved relative to each other in three dimensions by an x-y-z gantry system. The material solidifies after it is deposited to form a three-dimensional element. The material may be a thermoplastic material which solidifies after deposition by cooling.

Extrusion heads and systems suitable for preparing three-dimensional elements as described above are commercially available from Stratasys FDM® modeling machines. The extrusion head, which includes a liquifier and a dispensing nozzle, receives modeling material in a solid form. The filament is heated to a flowable temperature inside the liquifier and it is then dispensed through the nozzle. Thermoplastic materials, particularly ABS thermoplastic, have been found particularly suitable for deposition modeling in the Stratasys FDM® modeling machines. A controller controls movement of the extrusion head in a horizontal x, y plane, controls movement of the build platform in a vertical z-direction, and controls the feeding of modeling material into the head. By controlling these processing variables, the modeling material is deposited at a desired flow rate in "beads" or "roads" layer-by-layer in areas defined from the CAD model to create a three-dimensional object that resembles the CAD model. The modeling material thermally solidifies, and the finished model is removed from the substrate.

Having now described the present invention with references to the attached figures, it will be appreciated that in a first embodiment the present invention provides a papermaking belt comprising a support structure and a three-dimensional element attached to the support structure and extending in the z-direction therefrom, the support structure and the three-dimensional element consisting of different materials and wherein the three-dimensional element is formed by solid free form manufacturing or layer manufacturing.

In a second embodiment the present invention provides the papermaking belt of the first embodiment wherein the element is formed layer by layer, in a stepwise fashion, out of a flowable polymeric material from a printing head onto a woven support structure.

In a third embodiment the present invention provides the papermaking belt of the first or the second embodiment wherein the three-dimensional element is a line element having a top surface and an opposing bottom surface, a first and a second aperture disposed on the top and bottom surfaces and a continuous channel connecting the first and the second apertures.

In a fourth embodiment the present invention provides the papermaking belt of the first through the third embodiments wherein the three-dimensional element is a line element having a substantially rectangular cross-sectional shape.

In a fifth embodiment the present invention provides the papermaking belt of the first through the fourth embodiments wherein the three-dimensional element is a line element having a sidewall, a bottom surface, a first and a second aperture disposed on the sidewall and the bottom surface and a continuous channel connecting the first and the second apertures.

In a sixth embodiment the present invention provides the papermaking belt of the first through the fifth embodiments wherein the belt comprises a plurality of substantially machine-direction oriented continuous three-dimensional line elements parallel to, and spaced apart from, one another.

In a seventh embodiment the present invention provides the papermaking belt of the sixth embodiment wherein the plurality of substantially machine-direction oriented continuous three-dimensional line elements have a sinusoidal shape having a wavelength from about 50 to about 200 mm and an amplitude from about 10 to about 40 mm and having a spacing (P) from about 2.0 to about 10 mm apart.

In an eighth embodiment the present invention provides an endless papermaking belt comprising a support structure having a machine and cross-machine direction and a machine contacting and an opposed upper surface; and a plurality of additively manufactured line elements disposed on the upper surface of the support structure, the line elements having a top surface, a bottom surface a pair of opposed sidewalls, a first aperture disposed on the top surface and a second aperture disposed on the bottom surface and a continuous channel connecting the first and second apertures.

In a ninth embodiment the present invention provides the endless papermaking belt of the eighth embodiment wherein the line elements are continuous and orientated in the machine direction of the support structure and are equally spaced apart from one another.

In a tenth embodiment the present invention provides the endless papermaking belt of the eighth or the ninth embodiment wherein the line elements have a rectangular cross-section.

In an eleventh embodiment the present invention provides the endless papermaking belt of the eighth through the tenth embodiments wherein the line elements have a height from 0.5 to about 3.5 mm and width from about 0.5 to about 3.5 mm.

In a twelfth embodiment the present invention provides the endless papermaking belt of the eighth through the eleventh embodiments wherein the line elements and upper surface of the support structure comprise the web contacting surface and wherein the line elements comprise from about 15 to about 35 percent of the surface area of the web contacting surface.

In a thirteenth embodiment the present invention provides the endless papermaking belt of the eighth through the twelfth embodiments wherein the line elements comprise a plurality of opposed apertures disposed on the top and bottom surfaces, the opposed apertures connected to one another by a continuous channel, wherein the apertures comprise from about 20 to about 90 percent of the total top surface area of the element.

In a fourteenth embodiment the present invention provides the endless papermaking belt of the eighth through the thirteenth embodiments wherein the apertures have a cross-section area from about 0.05 to about 0.5 mm$^2$.

In an fifteenth embodiment the present invention provides the endless papermaking belt of the eighth through the fourteenth embodiments further comprising an aperture disposed on at least one sidewall, the aperture connected to the aperture disposed on the bottom surface by a continuous channel.

We claim:
1. A endless papermaking belt comprising:
   a. a support structure having a machine and cross-machine direction and a machine contacting and an opposed upper surface; and b. a plurality of additively manufactured line elements disposed on the upper surface of the support structure, the line elements having a top surface, a bottom surface, a pair of opposed sidewalls, a first aperture disposed on the top surface and a second aperture disposed on the bottom surface, and a continuous channel connecting the first and second apertures.

2. The endless papermaking belt of claim 1 wherein the line elements are continuous and orientated in the machine direction of the support structure and are equally spaced apart from one another.

3. The endless papermaking belt of claim 1 wherein the line elements have a rectangular cross-section.

4. The endless papermaking belt of claim 3 wherein the line elements have a height from about 0.5 to about 3.5 mm and width from about 0.5 to about 3.5 mm.

5. The endless papermaking belt of claim 1 wherein the line elements and upper surface of the support structure comprise the web contacting surface and wherein the line elements comprise from about 15 to about 35 percent of the surface area of the web contacting surface.

6. The endless papermaking belt of claim 1 wherein the line elements comprise a plurality of opposed apertures disposed on the top and bottom surfaces, the opposed apertures connected to one another by a continuous channel, wherein the apertures comprise from about 20 to about 90 percent of the total top surface area of the element.

7. The endless papermaking belt of claim 1 wherein each aperture has a cross-section area from about 0.05 to about 0.5 $mm^2$.

8. The endless papermaking belt of claim 1 further comprising an aperture disposed on at least one sidewall, the aperture connected to the aperture disposed on the bottom surface by a continuous channel.

* * * * *